(12) United States Patent
Cho et al.

(10) Patent No.: US 7,453,667 B2
(45) Date of Patent: Nov. 18, 2008

(54) HARD DISK DRIVE, HARD DISK DAMPER, AND METHOD FOR THE SAME

(75) Inventors: Kyoung-man Cho, Seoul (KR); Dong-youl Choi, Suwon-si (KR)

(73) Assignee: Samsung Electronics Co., Ltd., Suwon-Si (KR)

( * ) Notice: Subject to any disclaimer, the term of this patent is extended or adjusted under 35 U.S.C. 154(b) by 412 days.

(21) Appl. No.: 11/263,842

(22) Filed: Nov. 2, 2005

(65) Prior Publication Data

US 2006/0092558 A1 May 4, 2006

(30) Foreign Application Priority Data

Nov. 3, 2004 (KR) ...................... 10-2004-0088871

(51) Int. Cl.
*G11B 33/08* (2006.01)
*G11B 33/14* (2006.01)
*G11B 33/12* (2006.01)
*G11B 25/04* (2006.01)

(52) U.S. Cl. ................................. 360/97.03; 360/97.02
(58) Field of Classification Search .............. 360/97.02, 360/97.03
See application file for complete search history.

(56) References Cited

U.S. PATENT DOCUMENTS

| 2002/0135933 A1* | 9/2002 | Harrison et al. .......... 360/97.02 |
| 2002/0181148 A1* | 12/2002 | Dahlenburg et al. ..... 360/97.02 |
| 2003/0072103 A1* | 4/2003 | Kang et al. ............... 360/97.02 |
| 2003/0179493 A1* | 9/2003 | Kim ........................ 360/97.02 |
| 2005/0190488 A1* | 9/2005 | Chan et al. ............... 360/97.02 |
| 2005/0270691 A1* | 12/2005 | Pottebaum et al. ....... 360/97.02 |

FOREIGN PATENT DOCUMENTS

| JP | 56137559 A | * 10/1981 |
| JP | 11-144439 | 5/1999 |
| JP | 2000-322871 | 11/2000 |
| JP | 2000-331460 | 11/2000 |
| JP | 2001-23347 | 1/2001 |
| JP | 2001-325785 | 11/2001 |
| JP | 2002124072 A | * 4/2002 |
| JP | 2003-249053 | 9/2003 |

OTHER PUBLICATIONS

KIPO Notice to Submit Response Issued Apr. 28, 2006.

* cited by examiner

*Primary Examiner*—William J Klimowicz
(74) *Attorney, Agent, or Firm*—Staas & Halsey LLP

(57) ABSTRACT

A hard disk drive, hard (HDD) disk damper, and method for the same. The HDD may include a base member, a spindle motor installed on the base member, a plurality of data storage disks mounted on the spindle motor, an actuator pivotably installed on the base member to move a read/write head to a predetermined position on each of the disks, and a disk damper disposed between adjacent disks of the plurality of disks reducing vibrations of the disks. The disk damper has at least one groove, having a predetermined depth from an outer circumferential surface thereof, extending a predetermined length along the circumference of an outer edge thereof. Accordingly, a disk damper of the present invention can reduce vibrations of disks and protect data recording surfaces of the disks from external shocks.

15 Claims, 5 Drawing Sheets

HARD DISK DRIVE, HARD DISK DAMPER, AND METHOD FOR THE SAME

CROSS-REFERENCE TO RELATED APPLICATIONS

This application claims the priority benefit of Korean Patent Application No. 10-2004-0088871, filed on Nov. 3, 2004, in the Korean Intellectual Property Office, the disclosure of which is incorporated herein in its entirety by reference.

BACKGROUND OF THE INVENTION

1. Field of the Invention

Embodiments of the present invention relate to a hard disk drive (HDD), and more particularly, to a HDD with a hard disk damper reducing vibrations of rotating disks and method for the same.

2. Description of the Related Art

Hard disk drives (HDDs) can store information for computers and reproduce data stored in a disk or record data on the disk using a read/write head. In such HDDs, the read/write head operates by being moved by an actuator to a desired position while being lifted a predetermined height over a recording surface of the rotating disk.

HDDs can include a spindle motor, one or more data storage disks mounted on the spindle motor, and .an actuator to move a read/write head for reading and/or writing data to a predetermined position on the disks.

The disks, the spindle motor, and the actuator can be enclosed by a housing made up of a base member and a cover member. The base member and the cover member can be assembled using a plurality of fastening screws, for example.

In such HDDs, the rotating disks may flutter due to structural defects of the spindle motor, deflection of the disks during an assembly process, and turbulent air flow within the HDDs. In particular, non-negligible air flow may be generated around the rapidly rotating disks, for example, in the spaces between the disks, such that the air flow can cause the disks to vibrate. Once such vibrations of the disks occur, position error signals (PESs) increase and data writing and/or reading operations of the read/write head deteriorate, thereby negatively affecting the performance of the HDDs.

In a recent attempt to solve these problems, a thin plate-shaped disk damper has been installed between adjacent disks.

FIG. 1 illustrates a conventional disk damper installed between disks, with FIG. 2 illustrates a vertical sectional view of disks and a disk damper, as shown in FIG. 1.

Referring to FIGS. 1 and 2, a plurality of disks 31 and 32 can be amounted on a spindle motor 20, installed on a base member 10 of a hard disk drive (HDD). A disk damper 40 can be installed between the disks 31 and 32. Once the disk damper 40 is installed between the disks 31 and 32, the distance between the disk damper 40 and each of the disks 31 and 32 narrows, and thus vibrations of the disks 31 and 32 become reduced by a damping effect of air being compressed between the disk damper 40 and each of the disks 31 and 32.

However, when the distance between the disk damper 40 and each of the disks 31 and 32 narrows, as the disk damper 40 is installed between the disks 31 and 32, if external shocks are applied (e.g., during a shock test), outer edges of the disks 31 and 32 and an edge portion of the disk damper 40 can vertically move and come into contact with each other. In this case, data recording surfaces of the disks 31 and 32 can be damaged, thereafter resulting in errors being generated during later read and write operations.

In particular, the disk damper 40 has an outer circumference conforming with outer circumferences of the disks 31 and 32. Thus, if there is an error during the installation of the disk damper 40, and the disk damper 40 moves inward such that the outer circumference of the disk damper 40 is laid within the outer circumference of each of the disks 31 and 32, it is more probable that the data recording surfaces of the disks 31 and 32 will be damaged.

SUMMARY OF THE INVENTION

Embodiments of the present invention include a hard disk drive with a hard disk damper having a shape that reduces vibrations of disks while protecting data recording surfaces of the disks from external shocks, and method for the same.

To achieve the above and/or other aspects and advantages, embodiments of the present invention include a disk damper, disposed between adjacent data storage disks of a plurality of data storage disks mounted on a spindle motor of a hard disk drive, reducing vibrations of the data storage disks, the disk damper including a disk with an outer circumference of the disk being based on an outer circumference of an adjacent data storage disk, wherein the disk includes at least one groove of a predetermined depth from the outer circumference of the disk and extending along the outer circumference of the disk a predetermined length The disk may be ring shaped with an opening in the ring shaped disk. In addition, the opening in the ring shaped disk may have a depth extending from an inner circumference of the disk to the outer circumference of the disk.

The groove may be arc shaped with a predetermined width. Further, An outer diameter of the disk may be greater than an outer diameter of at least one of the data storage disks, and an outer diameter of the disk where the groove is formed is less than the outer diameter of the at least one data storage disk. The groove may also be formed along the outer circumference of the disk at a location where it is probable the disk damper and the data adjacent storage disks will contact when external shocks are applied to the hard disk drive, with the probable contact location potentially being a most probable contact location. The groove may further be formed at a location opposite to a side of the spindle motor where an actuator of the disk drive is located.

A plurality of grooves may be formed along the outer circumference of the disk.

To achieve the above and/or other aspects and advantages, embodiments of the present invention include a hard disk drive, including a base member, a spindle motor on the base member, a plurality of data storage disks mounted on the spindle motor, an actuator pivotably installed to the base member and to move a read/write head to a predetermined position on at least one of the data storage disks, and a disk damper disposed between adjacent data storage disks of the plurality of data storage disks to reduce vibrations of the data storage disks, wherein the disk damper includes at least one groove of a predetermined depth from an outer circumferential surface of the disk damper extending a predetermined length along the outer circumferential surface.

The disk damper may be ring shaped with an opening in the ring shaped disk damper being based on an activity scope of the actuator. In addition, the opening in the ring shaped disk damper may have a depth extending from an inner circumference of the disk damper to the outer circumferential surface.

Additional aspects and/or advantages of the invention will be set forth in part in the description which follows and, in part, will be apparent from the description, or may be learned by practice of the invention.

BRIEF DESCRIPTION OF THE DRAWINGS

These and/or other aspects and advantages of the invention will become apparent and more readily appreciated from the following description of the embodiments, taken in conjunction with the accompanying drawings of which.

DETAILED DESCRIPTION OF THE PREFERRED EMBODIMENTS

Figure 1:
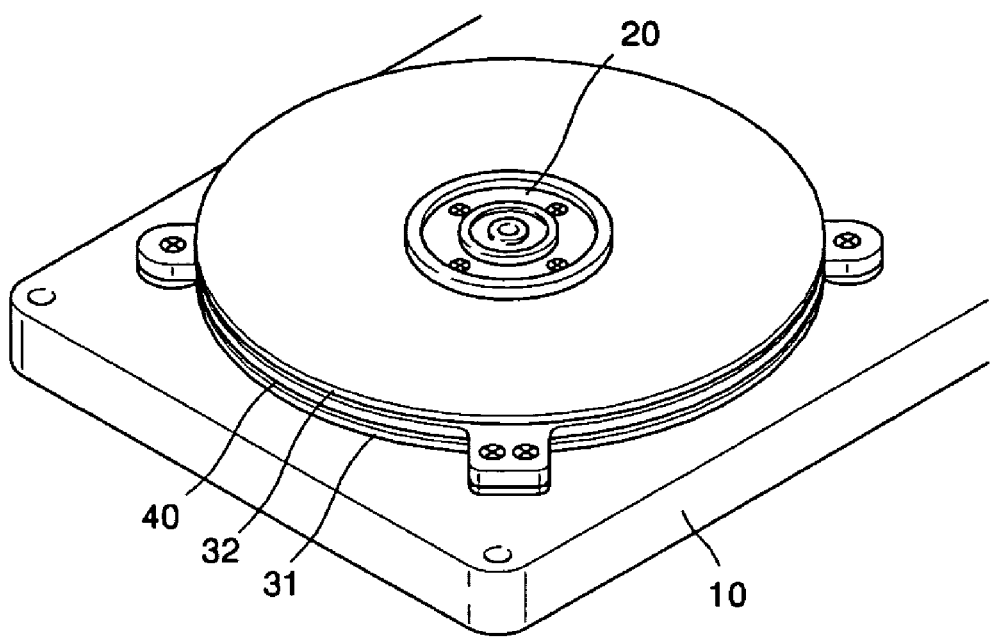
FIG. 1 illustrates a conventional disk damper installed between adjacent disks.
Figure 2:
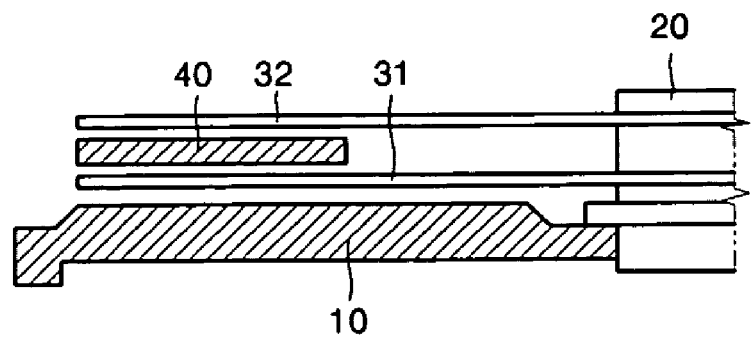
FIG. 2 illustrates a vertical sectional view of disks and a disk damper, such as that shown in FIG. 1.

Reference will now be made in detail to embodiments of the present invention, examples of which are illustrated in the accompanying drawings, wherein like reference numerals refer to the like elements throughout. Embodiments are described below to explain the present invention by referring to the figures.

Figure 3:
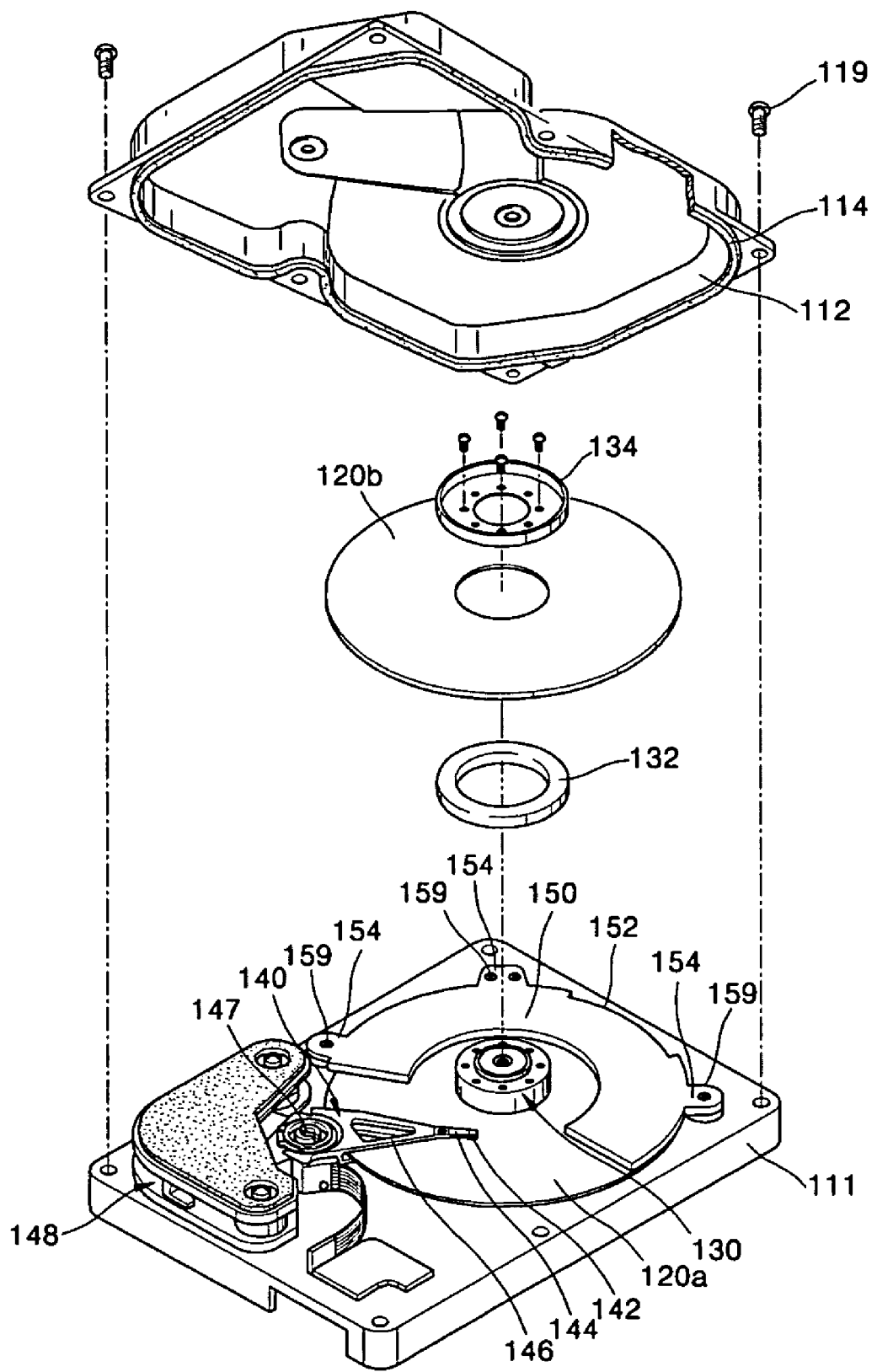
FIG. 3 illustrates a hard disk drive (HDD) having a disk damper, according to an embodiment of the present invention.
Figure 4:
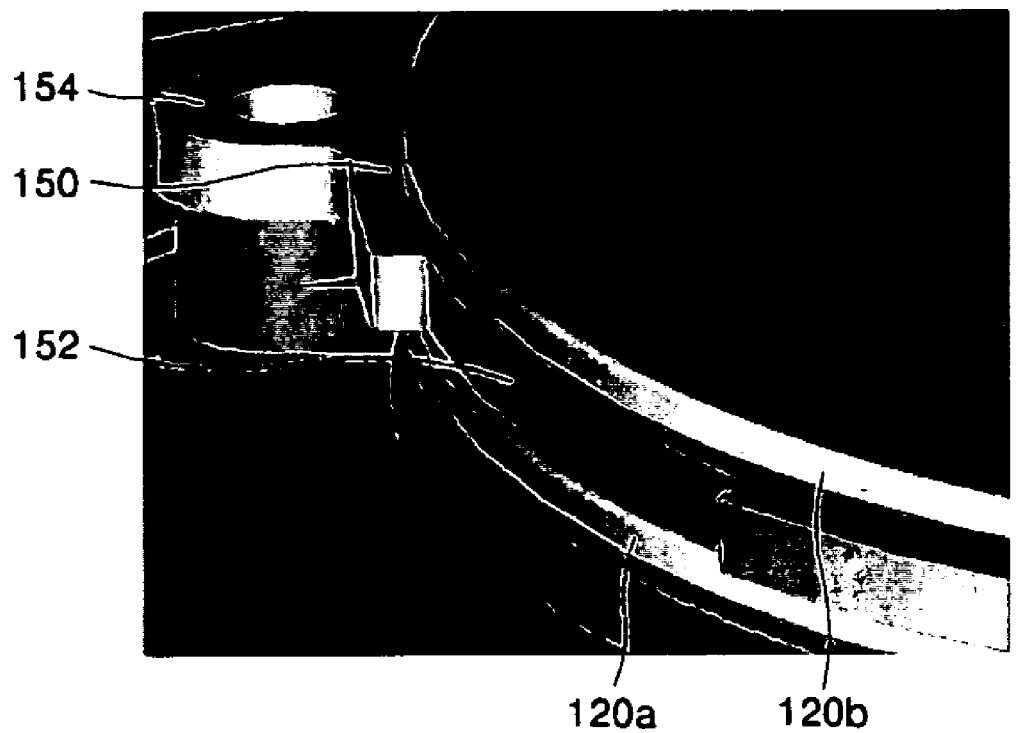
FIG. 4 illustrates an enlarged partial perspective view of a groove of a disk damper, e.g., such as that shown in FIG. 3, according to an embodiment of the present invention.
Figure 5:
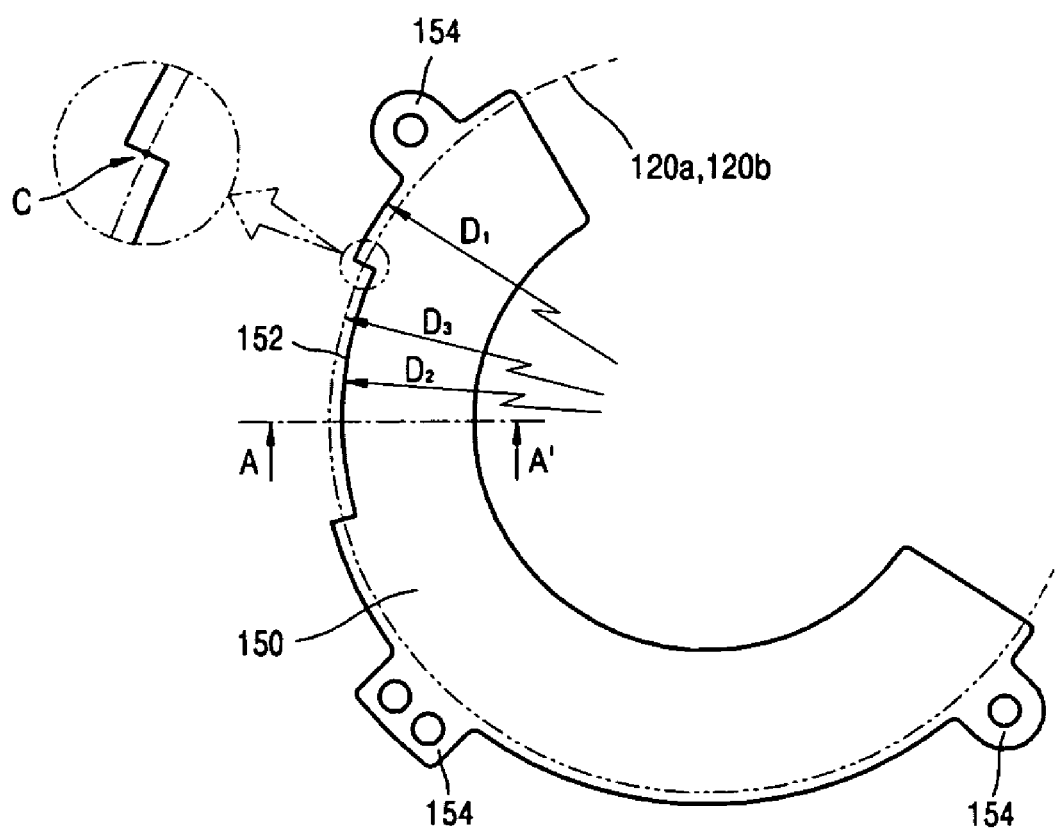
FIG. 5 illustrates a plan view of a disk damper, e.g., such as that shown in FIG. 3, according to an embodiment of the present invention.
Figure 6:
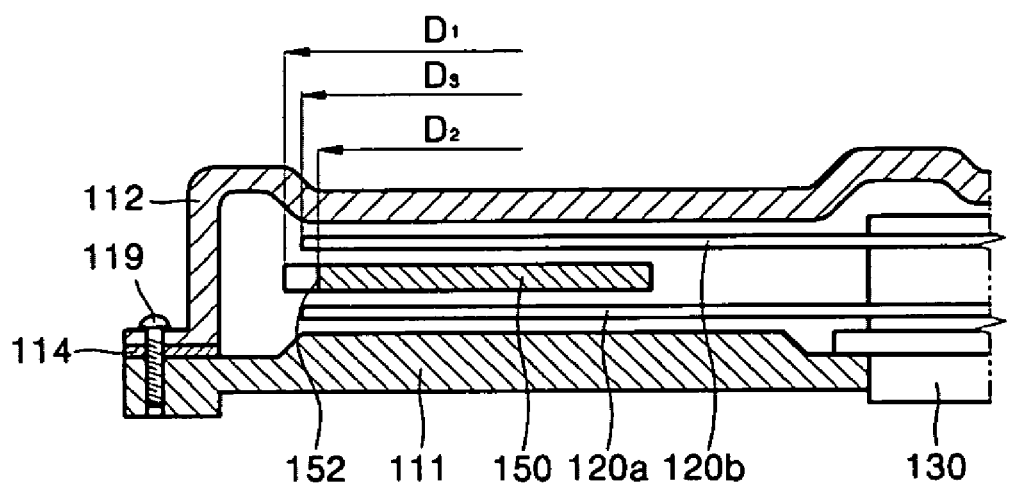
FIG. 6 illustrates a partial vertical sectional view of a disk damper and disks along line A-A' of FIG. 5, according to an embodiment of the present invention.

FIG. 3 illustrates a hard disk drive (HDD) having a disk damper, FIG. 4 illustrates an enlarged partial perspective view of a groove of a disk damper, such as that shown in FIG. 3, FIG. 5 illustrates a disk damper, such as that shown in FIG. 3, and FIG. 6 illustrates a partial vertical sectional view of a disk damper and disks taken along line A-A' of FIG. 5, according to embodiments of the present invention.

Referring to FIGS. 3 through 6, an HDD may include a plurality of data storage disks 120a and 120b, a spindle motor 130 to rotate the disks 120a and 120b, and an actuator 140 to move a read/write head to a predetermined position on each of the disks 120a and 120b.

The disks 120a and 120b, the spindle motor 130, and the actuator 140 may be enclosed and protected by a base member 111 and a cover member 112 with the base member 111 and the cover member 112 potentially being coupled to each other by a plurality of fastening screws 119, for example. Here, a gasket 114 can be inserted between the base member 111 and the cover member 112 to prevent dust or humidity from entering the inside of the HDD. The gasket 113 may be generally made of a viscoelastic material (e.g., rubber) and aids in reducing the vibrations of the HDD.

The plurality of disks 120a and 120b may be data recording media and may be mounted on and rotated by the spindle motor 130.

The spindle motor 130, to rotate the disks 120a and 120b, can be installed on the base member 111. When the plurality of disks 120a and 120b are mounted on the spindle motor 130, as described above, a ring-shaped spacer 132 can be inserted between the disks 120a and 120b to maintain the distance between the disks 120a and 120b. A disk clamp 134 can also be fastened to a top portion of the spindle motor 130 to prevent separation of the disks 120a and 120b.

The actuator 140, which can move the read/write head, for the recording and/or reproducing of data on the disks 120a and 120b, to a predetermined position on each of the disks 120a and 120b, and may be pivotably installed on the base member 111. Specifically, the actuator 140 can include a swing arm 146, rotatably coupled to an actuator pivot 147 installed on the base member 111, a suspension 144 installed at one end of the swing arm 146 and elastically biasing a slider 142 with the read/write head thereon toward a surface of each of the disks 120a and 120b, and a voice coil motor (VCM) 148 to rotate the swing arm 146.

The VCM 148 can be controlled by a servo control system, and rotate the swing arm 146 in a direction defined by Fleming's Left Hand Rule due to an interaction between current input to a VCM coil and a magnetic field formed by magnets. That is, if the HDD is turned on and the disks 120a and 120b begin to rotate, the VCM 148 can rotate a respective swing arm 146 and move a respective slider 142 with a read/write head to a data recording surface of each of the disks 120a and 120b. The slider 142 can be lifted a predetermined height above the surface, that is, the data recording surface of each of the disks 120a and 120b due to a lifting force generated by the rotating disks 120a and 120b. In this state, the read/write head mounted on the slider 142 can reproduce and/or record data from/to the recording surface of each of the disks 120a and 120b. In contrast, when the HDD does not operate, that is, the disks 120a and 120b are not rotating, the VCM 148 can rotate the swing arm 146 to remove the slider 142 with the read/write head from the data recording surface of each of the disks 120a and 120b.

A HDD according to embodiments of the present invention may include a disk damper 150 disposed between the disks 120a and 120b. The disk damper 150 reduces the vibrations of the disks 120a and 120b. In particular, the disk damper 150, according to an embodiment of the present invention, has a shape that can prevent the data recording surface of each of the disks 120a and 120b from being damaged.

In detail, the disk damper 150 can have a thin plate shape, and may be disposed between the disks 120a and 120b. As illustrated in FIGS. 3 through 6, when the two disks 120a and 120b are mounted on the spindle motor 130, one disk damper 150 can be disposed between the two disks 120a and 120b. If three or more disks are mounted on the spindle motor 130, each disk damper 150 can be disposed between adjacent disks of the plurality of disks. The disk damper 150 can be fixedly supported by the base member 111. To this end, a plurality of support projections 154 can protrude from an outer circumference of the disk damper 150. The support projections 154 can be fixed to the base member 111 using fixing screws 159, for example. As another example, the disk damper 150 may be manufactured by pressing an aluminium plate, or using aluminium die-casting or plastic injection molding.

A distance between a top surface of the disk damper 150 and a bottom surface of the upper disk 120b, facing the top surface of the disk damper 150, and a distance between a bottom surface of the disk damper 150 and a top surface of the lower disk 120a, facing the bottom surface of the disk damper 150, respectively, may range from 0.3 to 0.5 mm, for example. As such, if the distance between the disk damper 150 and each of the disks 120a and 120b is sufficiently narrow, vibrations of the disks 120a and 120b can be reduced by damping the air flowing between the disk damper 150 and each of the disks 120a and 120b.

The disk damper 150 may have a large area, while still not interfering with other elements of the HDD, for example, the actuator 140. This is because the larger the area of the disk damper 150 facing the disks 120a and 10b, the more effectively the air damping effect can be obtained. To be specific, the disk damper 150 can have a ring shape with an opening at a portion embracing the potential activity scope of the actuator 140.

The disk damper 150 can have a shape that can prevent the data recording surface of each of the disks 120a and 120b from being damaged by external shocks, as described above. In detail, at least one groove 152 can be formed along an outer edge of the disk damper 150, for example.

The groove 152 may be formed at a probable contact location, e.g., a most probably contact location, between the disk damper 150 and the disks 120a and 120b, when external shocks are applied to the HDD. The location can be determined through a shock test (e.g., a tilt drop test or a linear drop test) performed on the HDD, for example. As seen from a shock test, a most probable damage location on the data recording surface of each of the disks 120a and 120b, due to the contact between the disk damper 150 and the disks 120a and 120b, may be opposite to the location of the actuator 140 corresponding to the rotation of the spindle motor 130.

The groove 152 may have a predetermined depth, from an outer circumferential surface of the disk damper 150, and may extend a predetermined circumferential distance along the outer edge of the disk damper 150. Accordingly, the groove 152 can have an arc shape with a predetermined width. As shown in FIGS. 5 and 6, a first diameter D, of the disk damper 150, where the groove 152 is not formed may be greater than an outer diameter $D_3$ of each of the disks 120a and 120b, and a second outer diameter $D_2$ of the disk damper 150 where the grove 152 is formed may be less than the outer diameter $D_3$ of each of the disks 120a and 120b. Here, it may be preferable that the first diameter D, of the disk damper 150 be as large as possible unless the disk damper 150 interferes with the base member 111 or the cover member 112 of the HDD. Because the outer circumference of the disk damper 150 is not within an outer circumference of each of the disks 120a and 120b an error, e.g., a shock causing the recording surfaces of disks 120a and 120b to contact, will not occur during the installation of the disk damper 150. It may be preferable that a difference between the second outer diameter $D_2$ of the disk damper 150 and the outer diameter $D_3$ of each of the disks 120a and 120b be greater than an assembly tolerance of the disk damper 150. This is because an outer circumference of the groove 152 of the disk damper 150 can be prevented from jutting beyond the outer circumference of each of the disks 120a and 120b even if an error occurs during the installation of the disk damper 150. In the meantime, if the area of the groove 152 is increased, disk vibration reducing effects of the disk damper 150 decrease. To prevent this, it may be preferable that the difference between the second outer diameter $D_2$ of the disk damper 150 and the outer diameter $D_3$ of each of the disks 120a and 120b be as small as possible within a range satisfying the above conditions, for example.

When the disk damper 150, having the groove 152, is installed between the disks 120a and 120b, if the disk damper 150 and the disks 120a and 120b contact each other due to external shocks, a contact point C may be seen to be exactly located at an outer edge of each of the disks 120a and 120b as shown in FIG. 5. However, in general, data is not recorded in the outer edge of the disks 120a and 120b. Accordingly, even though the outer edge may be damaged, data recorded on the data recording surface of each of the disks 120a and 120b will not be affected by the damage.

Below, table 1 describes an HDD having a conventional disk damper and an HDD having a disk damper according to an embodiment of the present invention, adopted for a 90° tilt drop test, for example.

TABLE 1

|  | Conventional Disk Damper | Disk Damper of Present Invention |
|---|---|---|
| T | 2.17 mm | 2.17 mm |
| G1 | 0.4 mm | 0.4 mm |
| G2 | 0.5 mm | 0.5 mm |
| Rate of Defective Products | 12% | 0% |

In Table 1, T represents a thickness of a disk damper, G1 represents a distance between the disk damper and a lower disk, and G2 represents a distance between the disk damper and an upper disk.

Referring to Table 1, while the thickness of the disk damper and the distance between the disk damper and the disks may be the same between the embodiment of the present invention and the conventional disk damper, the HDD having the conventional disk damper has a defective rate of 12% and the HDD having the disk damper according to the embodiment of the present invention has a defective rate of 0% in the shock test.

Meanwhile, through investigations, there was little difference in position error signals between the HDD having the conventional disk damper and the HDD having the disk damper according to the embodiment of the present invention.

Accordingly, the disk damper according to embodiment of the present invention can protect the data recording surface of the disk from external shocks as well as reduce the vibrations of the disk.

Figure 7:
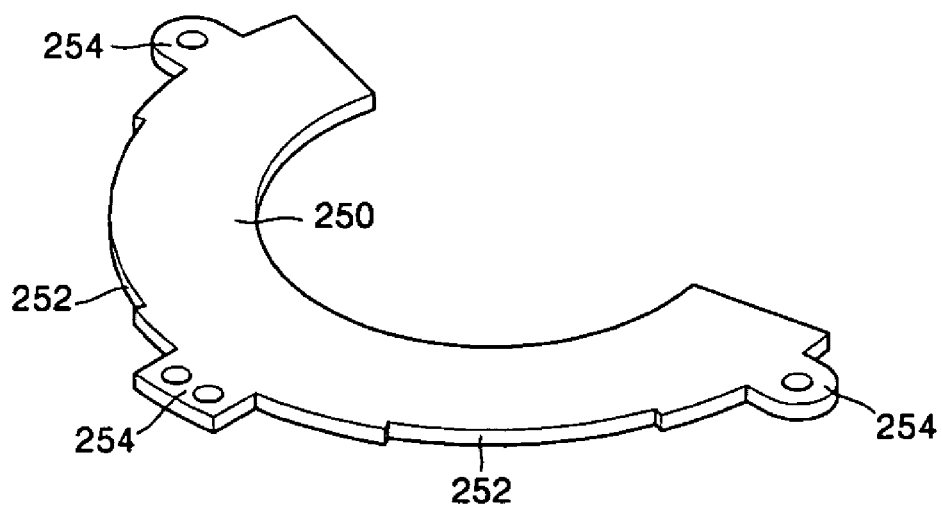
FIG. 7 illustrates a perspective view of a modified example of a disk damper, e.g., such as that shown in FIGS. 3 through 6, according to embodiments of the present invention.

FIG. 7 illustrates a perspective view of another disk damper embodiment, such as those shown in FIGS. 3 through 6. Since the disk damper illustrated in FIG. 7 is similar to the disk damper illustrated in FIGS. 3 through 6, except for the number and locations of grooves, further explanations for FIG. 7 will be provided focusing on the difference therebetween.

Referring to FIG. 7, a disk damper 250 may include a plurality of grooves 252, for example, two grooves 252. The two grooves 252 can be disposed along an outer edge of the disk damper 250 and spaced a predetermined distance from each other. For example, three support projections 254, fixed to a base member of an HDD, can protrude from the disk damper 250, with each of the two grooves 252 being disposed between adjacent support projections of the three support projections 254. The shape and size of the two grooves 252 can be the same as those of the disk damper 150, illustrated in FIGS. 3 through 6, for example.

Since a base member, a cover member, an actuator, a spindle motor, and disks of an HDD respectively may have various sizes, shapes, and arrangements, when external shocks are applied to the HDD, the movements of the disks and the disk damper vary depending on the size, the shape, and the arrangement of each element. Accordingly, it may be preferable that areas where the disk damper 250 and the disks often contact can be verified through a shock test and the locations and number of the grooves 252 be properly adjusted according to the results of the shock test, for example.

As described above, even though a disk damper and disks may contact each other, when external shocks are applied to the HDD (e.g., during a shock test), since the contact point is located at the outer edge of the disks, the data recording surfaces of the disks can be prevented from contacting the disk damper. Thus, the disk damper can reduce vibrations of the disks and also protect the data recording surfaces of the disks from external shocks.

Although a few embodiments of the present invention have been shown and described, it would be appreciated by those skilled in the art that changes may be made in these embodiments without departing from the principles and spirit of the invention, the scope of which is defined in the claims and their equivalents.

What is claimed is:

1. A disk damper, disposed between adjacent data storage disks of a plurality of data storage disks mounted on a spindle motor of a hard disk drive, reducing vibrations of the data storage disks, the disk damper comprising:
   a disk with an outer circumference of the disk being based on an outer circumference of an adjacent data storage disk,
   wherein the disk comprises at least one groove of a predetermined depth from the outer circumference of the disk and extending along the outer circumference of the disk a predetermined length, and
   an outer diameter of the disk is greater than an outer diameter of at least one of the data storage disks, and an outer diameter of the disk where the groove is formed is less than the outer diameter of the at least one data storage disk.

2. The disk damper of claim 1, wherein the disk is ring shaped with an opening in the ring shaped disk.

3. The disk damper of claim 2, wherein the opening in the ring shaped disk has a depth extending from an inner circumference of the disk to the outer circumference of the disk.

4. The disk damper of claim 1, wherein the groove is arc shaped with a predetermined width.

5. The disk damper of claim 1, wherein the groove is formed along the outer circumference of the disk at a location where it is probable the disk damper and the adjacent data storage disks will contact when external shocks are applied to the hard disk drive.

6. The disk damper of claim 5, wherein the probable contact location is a most probable contact location.

7. The disk damper of claim 5, wherein the groove is formed at a location opposite to a side of the spindle motor where an actuator of the disk drive is located.

8. The disk damper of claim 1, wherein a plurality of grooves are formed along the outer circumference of the disk.

9. A hard disk drive, comprising:
   a base member;
   a spindle motor on the base member;
   a plurality of data storage disks mounted on the spindle motor;
   an actuator pivotably installed to the base member and to move a read/write head to a predetermined position on at least one of the data storage disks; and
   a disk damper disposed between adjacent data storage disks of the plurality of data storage disks to reduce vibrations of the data storage disks,
   wherein the disk damper comprises at least one groove of a predetermined depth from an outer circumferential surface of the disk damper extending a predetermined length along the outer circumferential surface, and
   an outer diameter of the disk damper is greater than an outer diameter of at least one adjacent data storage disk, and an outer diameter of the disk damper where the groove is formed is less than the outer diameter of the at least one adjacent data storage disk.

10. The hard disk drive of claim 9, wherein the disk damper is ring shaped with an opening in the ring shaped disk damper being based on an activity scope of the actuator.

11. The hard disk drive of claim 10, wherein the opening in the ring shaped disk damper has a depth extending from an inner circumference of the disk damper to the outer circumferential surface.

12. The hard disk drive of claim 10, wherein a plurality of grooves are formed along the outer circumferential surface of the disk damper.

13. The hard disk drive of claim 9, wherein the groove is arc shaped with a predetermined width.

14. The hard disk drive of claim 9, wherein the groove is formed along the outer circumferential surface of the disk damper at a location where it is most probable the disk damper and at least one adjacent data storage disk will contact when external shocks are applied to the hard disk drive.

15. The hard disk drive of claim 14, wherein the groove is formed at a location opposite to a side of the spindle motor where the actuator is located.

* * * * *